(12) United States Patent
Cesana et al.

(10) Patent No.: US 7,679,921 B2
(45) Date of Patent: Mar. 16, 2010

(54) SECURITY CLOTH DESIGN AND ASSEMBLY

(75) Inventors: Mario L. Cesana, Milan (IT); Donald S. Farquhar, Endicott, NY (US); Martino Taddei, Merate (IT)

(73) Assignee: International Business Machines Corporation, Armonk, NY (US)

( * ) Notice: Subject to any disclaimer, the term of this patent is extended or adjusted under 35 U.S.C. 154(b) by 1008 days.

(21) Appl. No.: 11/267,770

(22) Filed: Nov. 4, 2005

(65) Prior Publication Data
US 2006/0080348 A1   Apr. 13, 2006

Related U.S. Application Data

(62) Division of application No. 09/717,698, filed on Nov. 20, 2000, now Pat. No. 6,982,642.

(51) Int. Cl.
*H05K 1/00* (2006.01)
(52) U.S. Cl. .................................. 361/749; 428/68
(58) Field of Classification Search ............... 361/749; 428/68; 321/107; 174/52.4
See application file for complete search history.

(56) References Cited

U.S. PATENT DOCUMENTS

| | | | |
|---|---|---|---|
| 4,972,175 A | 11/1990 | MacPherson | |
| 5,027,397 A | 6/1991 | Double et al. | |
| 5,136,643 A | 8/1992 | Fischer | |
| 5,159,629 A | 10/1992 | Double et al. | |
| 5,239,664 A | 8/1993 | Verrier et al. | |
| 5,289,785 A | 3/1994 | MacPherson et al. | |
| 5,406,630 A | 4/1995 | Piosenka et al. | |
| 5,675,319 A | 10/1997 | Rivenberg et al. | |
| 5,858,500 A * | 1/1999 | MacPherson | 428/68 |
| 5,861,662 A | 1/1999 | Candelore | |
| 5,881,155 A | 3/1999 | Rigal | |
| 6,084,380 A * | 7/2000 | Burton | 320/107 |
| 7,007,171 B1 * | 2/2006 | Butturini et al. | 713/194 |
| 7,180,008 B2 * | 2/2007 | Heitmann et al. | 174/261 |
| 2002/0084090 A1 * | 7/2002 | Farquhar et al. | 174/52.4 |
| 2006/0049941 A1 * | 3/2006 | Hunter et al. | 340/545.6 |

OTHER PUBLICATIONS

IBM Technical Disclosure Bulletin, "Security Enclosure With Elastomeric Contact Stripes," Feb. 1991, vol. 33, No. 9; pp. 444-445.

* cited by examiner

*Primary Examiner*—Jinhee J Lee
*Assistant Examiner*—Andargie M Aychillhum
(74) *Attorney, Agent, or Firm*—Schmeiser, Olsen & Watts; Yuanmin Cai

(57) ABSTRACT

A security enclosure and method of forming the security enclosure. The security enclosure includes an electronic assembly, an extension, and a tamper respondent wrap. The extension has a first end inserted in the assembly and a second end having at least one bonding pad thereon. The tamper respondent wrap at least partially surrounds the assembly. The wrap has a bonding pad. The bonding pad of the extension is secured to the bonding pad of the wrap. The tamper respondent wrap includes a plurality of layers. A plurality of electrically conductive lines or a plurality of electrically conductive ink traces exist within each layer of the wrap.

12 Claims, 5 Drawing Sheets

SECURITY CLOTH DESIGN AND ASSEMBLY

This application is a divisional of Ser. No. 09/717,698, presently issued as U.S. Pat. No. 6,982,642. and filed on Nov. 20, 2000.

BACKGROUND OF THE INVENTION

1. Technical Field

The present invention relates generally to the detection of intrusions into security enclosures, and more particularly, to the assembly of a security enclosure capable of detecting intrusions.

2. Related Art

Security enclosures are commonly used in network electronics commerce to transmit encrypted information to authorized persons. FIG. 1 shows a related art security enclosure 8, comprising an electronic assembly 10, which typically comprises a cryptographic processor card within an enclosure, and a tamper respondent wrap or cloth 12. The cloth 12 adheres to the assembly 10 by an adhesive on the inner surface of the cloth 12. The cloth 12 typically consists of several layers of a flexible dielectric having electrical traces or lines (not shown) thereon. Damage to any of the traces within a layer produces a change in resistance which prompts the cryptographic processor card to erase the information stored therein.

As illustrated in FIG. 2, a first side of the cloth 12 is wrapped around the assembly 10. An end 16 of the cloth 12 is inserted within an opening 14 of the assembly 10. The end 16 comprises a plurality of silver filled ink lines formed on the surface of the end 16 to provide an electrical connection between the cloth 12 and the assembly 10. Thereafter, a second end of the cloth 12 is wrapped around the assembly 10, covering the inserted end 16 and over-lapping the first end of the cloth 12 (FIG. 3).

Unfortunately, because the cloth 12 is constructed of multiple layers (not shown) of unreinforced organic dielectric materials which are dimensionally unstable, i.e., susceptible to deformation due to environmental changes, it is difficult to maintain layer-to-layer alignment. As a result, it is difficult to ensure that each layer of the cloth terminates at the end 16, which is necessary in order to make the proper connection with the assembly 10. Likewise, the silver coating at the end 16 is susceptible to electromigration problems, thereby resulting in potential device failure. Furthermore, because the adhesive material on the inner surface of the cloth 10 securely adheres the cloth 12 to the assembly 10 prior to inserting the end 16 into the assembly 10, alignment of the end 16 into the opening 14 of the assembly 10 is often difficult, particularly when the cloth 12 and assembly 10 are slightly misaligned. This may result in device failure due to a poor connection between the end 16 of the cloth 12 and the assembly 10. Likewise, additional forces exerted on the connection over time due to thermal and mechanical stresses, may further weaken the poor connection producing device failure. Moreover, the process of folding the security cloth and inserting the end into the connector is not amenable to automation, thus increasing manufacturing costs. Accordingly, there exists a need in the industry for a security enclosure that solves these and other problems.

SUMMARY OF THE INVENTION

The first general aspect of the present invention provides a security enclosure, comprising: an electronic assembly; a tamper respondent wrap secured around the assembly; and an extension cable electrically connecting the cloth to the assembly.

The second general aspect of the present invention provides a security enclosure, comprising: an electronic assembly; an extension, having a first end inserted in the assembly, and a second end having at least one bonding pad thereon; and a tamper respondent wrap surrounding the assembly, having at least one corresponding bonding pad, wherein the bonding pad of the extension is secured to the bonding pad of the wrap.

The third general aspect of the present invention provides a security enclosure, comprising: an electronic assembly; and a tamper respondent wrap electrically connected to the assembly via an attachable extension.

The fourth general aspect of the present invention provides a flexible extension for use in a security enclosure, comprising: a first end having a plurality of interconnections which are inserted within an electronic assembly of the enclosure; a second end having a plurality of bonding pads thereon which are secured to a tamper respondent wrap of the enclosure; and wherein the cable electrically connects the wrap and the assembly.

The fifth general aspect of the present invention provides a method of forming a security enclosure, comprising: providing an electronic assembly having an opening therein; inserting a first end of an extension within the opening of the assembly; wrapping a tamper respondent wrap at least partially around the assembly; and connecting a second end of the extension to the wrap.

The foregoing and other features of the invention will be apparent from the following more particular description of the embodiments of the invention.

BRIEF DESCRIPTION OF THE DRAWINGS

The embodiments of this invention will be described in detail, with reference to the following figures, wherein like designations denote like elements, and wherein.

DESCRIPTION OF THE PREFERRED EMBODIMENTS

Although certain embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc.

Although the drawings are intended to illustrate the present invention, the drawings are not necessarily drawn to scale.

Figure 1:
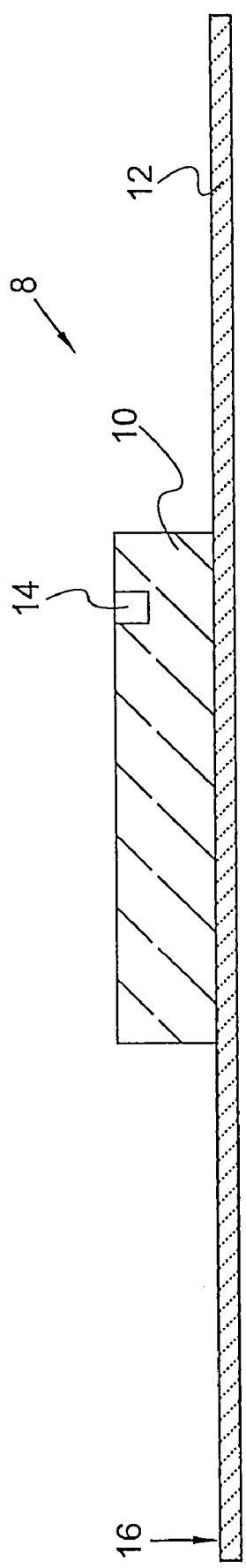
FIG. 1 depicts a cross-sectional view of a related art electronic assembly and tamper respondent cloth.
Figure 2:
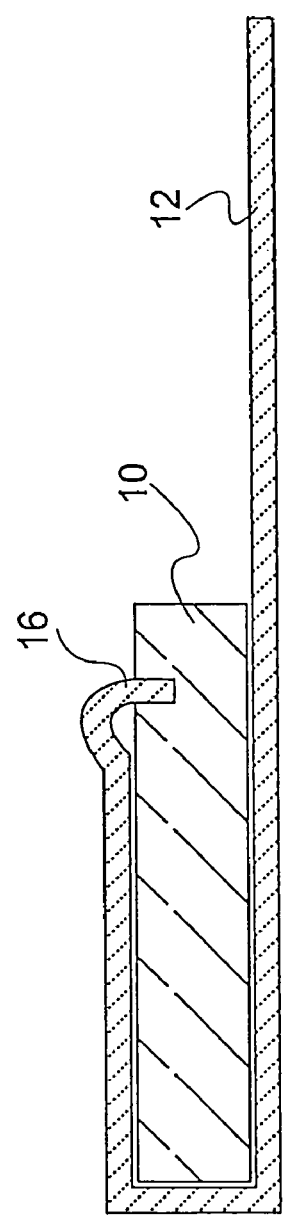
FIG. 2 depicts the related art assembly of FIG. 1 wherein the cloth is electrically connected to the assembly.
Figure 3:
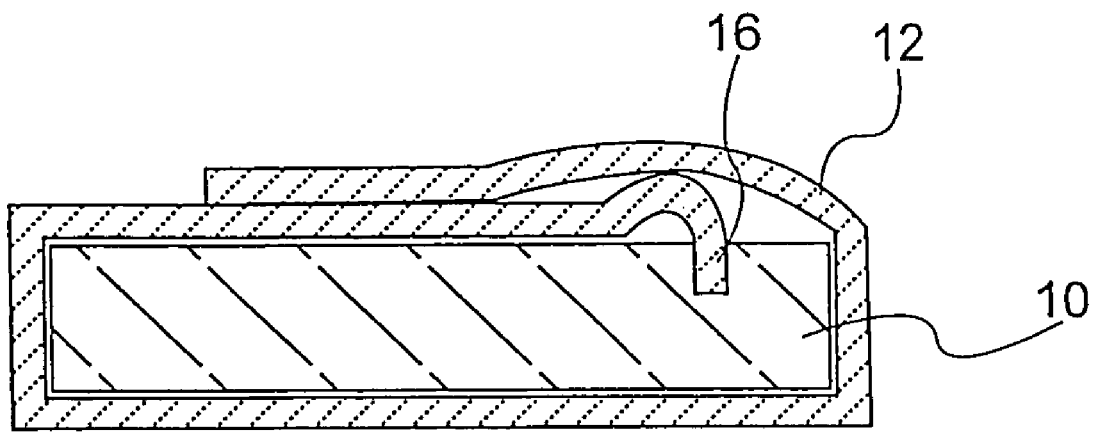
FIG. 3 depicts the related art assembly of FIG. 2 wherein the remainder of the cloth is secured around the assembly.
Figure 4:
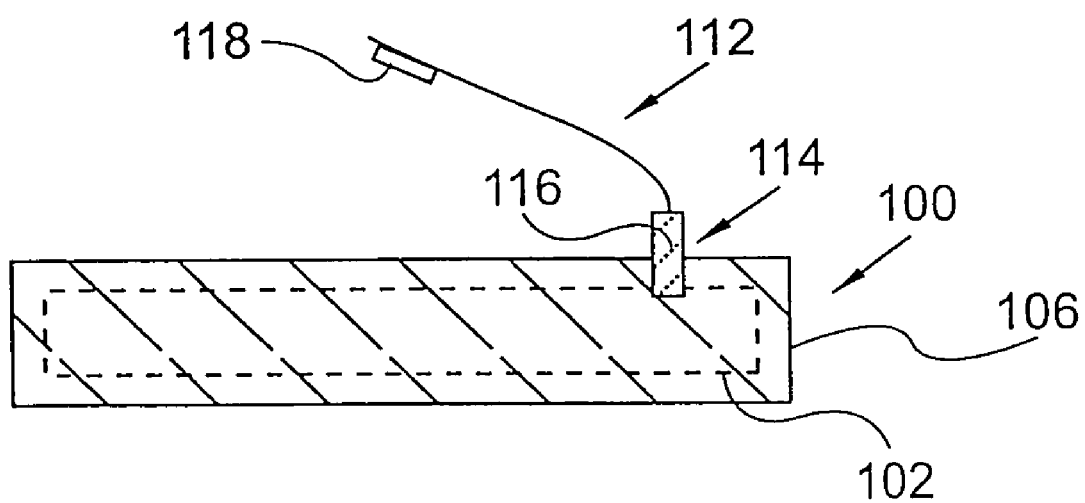
FIG. 4 depicts a cross-sectional view of an electronic assembly in accordance with the present invention.

Referring to the drawings, FIG. 4 shows a cross-sectional view of an electronic assembly 100 in accordance with the present invention. The assembly 100 typically comprises a cryptographic processor card 102 (shown in phantom), for the storage of key codes required to encrypt and decrypt the secured information, enclosed within a container 106, such as a metal box.

An extension cable 112 is inserted within an opening 114 of the assembly 100. The extension cable 112 comprises a polyimide dielectric material, such as Kapton™ (DuPont), Upilex™ (UBE), Mylar™ (DuPont), or other similar thin flexible dielectric material conventionally used in flex circuitry. In particular, a cable end 116 located at a first end of the extension cable 112 makes electrical connection with the cryptographic processor card 102 within the assembly 100. A plurality of bonding pads 118 located at a second end of the extension cable 112 makes electrical connection with a cloth (described below). The bonding pads 118 are formed of copper, having a nickel/gold plating thereon, or other metals, such as silver, etc. The gold provides good conductivity, and the nickel prevents the diffusion of gold into the copper. Alternatively, the bonding pads 118 may be formed of an electrically conductive thermosetting polymer, or an electrically conductive thermoplastic polymer.

Figure 5:
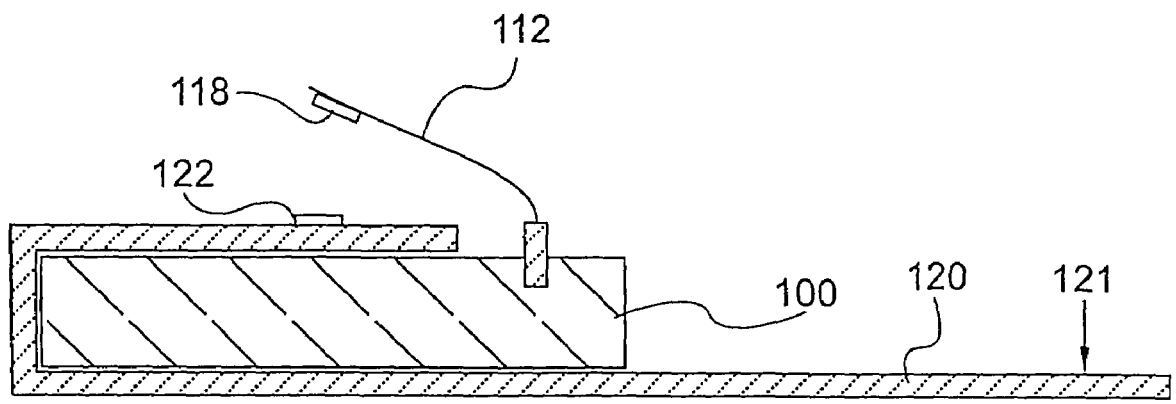
FIG. 5 depicts the assembly of FIG. 4 and a tamper respondent cloth.

As illustrated in FIG. 5, a tamper respondent wrap or cloth 120 is wrapped around the assembly 100, such that a plurality of bonding pads 122 on the cloth 120 align with the plurality of bonding pads 118 on the extension cable 112. The cloth 120, such as disclosed in the patent to MacPherson (U.S. Pat. No. 5,858,500), is a sheet of composite material comprising a laminate formed of a number of separate layers, including a delamination respondent layer, and a pierce and laser respondent layer. Each layer has a plurality of ink traces or lines (shown in FIG. 9) formed thereon, for the detection of intrusions. The lines may comprise an electrically conductive thermoplastic polymer, electrically conductive thermoset polymer, metal, etc. The cloth 120 further includes a pressure sensitive adhesive material 121 on the inner surface of the cloth 120, such that the cloth 120 securely adheres to the assembly 100. The bonding pads 122 are formed of copper, having a nickel/gold plating thereon, or other metals, such as silver, etc. Alternatively, the bonding pads 122 may be formed of an electrically conductive thermosetting polymer, or an electrically conductive thermoplastic polymer.

Figure 6:
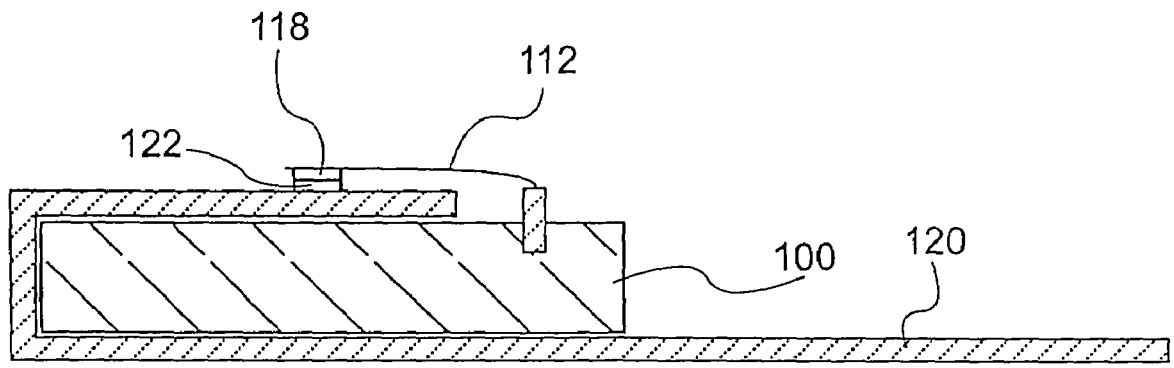
FIG. 6 depicts the assembly of FIG. 5 wherein bonding pads of the cloth and an extension cable are connected.

As illustrated in FIG. 6, the bonding pads 118 of the extension cable 112 are secured to the bonding pads 122 of the cloth 120 to complete the electrical connection between the cloth 120 and the assembly 100. A thermal compression bonding (TCB) process may be used in which heat and pressure are applied to the bonding pads 118, 122 until the bonding pads 118, 122 begin to melt and bond together. A heater having the correct dimensions corresponding to the size of the bonding pads 118, 122, conventionally used in TCB processing, may also be used to apply heat and pressure directly to the bonding pads 118, 122. The specific range of temperatures and pressures necessary to bring the metals, or base polymers within the bonding pads 118, 122 to their melting point depends upon the materials selected, and is commonly known in the art.

The bonding pads 118, 122 may be bonded directly to one another using the TCB process described above if the bonding pads 118, 122 are formed of a conductive thermoplastic polymer. In the event the bonding pads 118, 122 are formed of a conductive thermoset polymer, or a metal, an additional conductive adhesive is needed between the bonding pads 118, 122 to bond the pads 118, 122 together. For instance, an anisotropic conductive tape, such as 3m 7303™ (3M), may be inserted between the bonding pads 118, 122 prior to performing the TCB process to form the adhesive connection therebetween.

Figure 7:
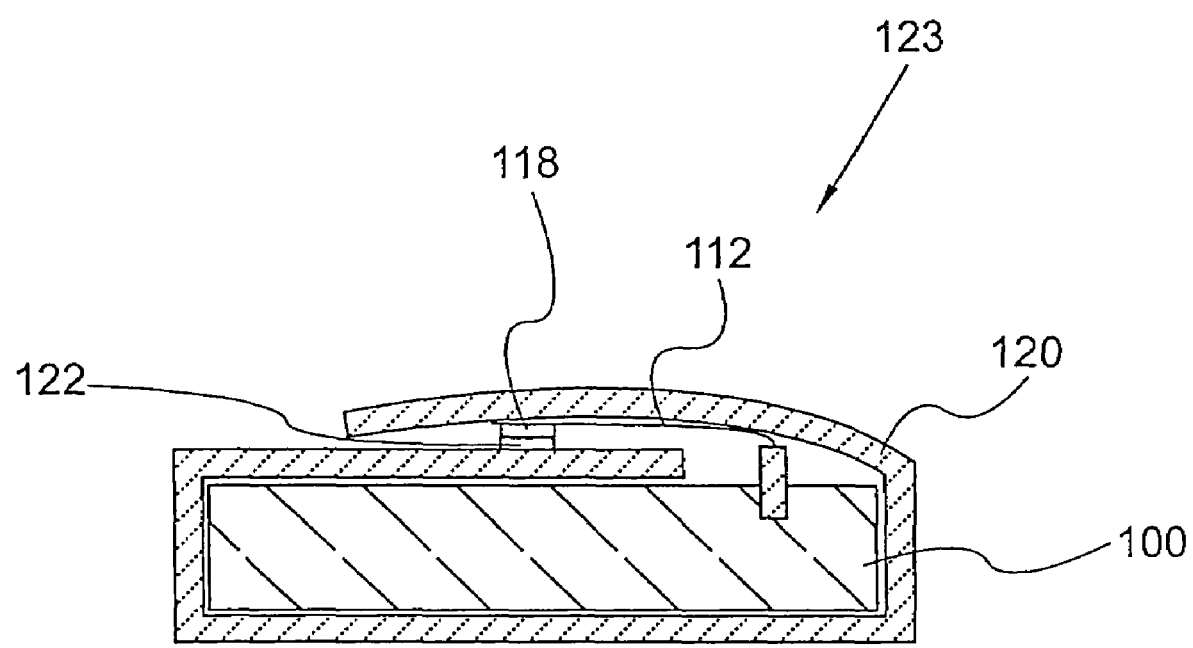
FIG. 7 depicts the assembly of FIG. 6 wherein the remainder of the cloth is secured around the assembly.

Thereafter, the remaining portion of the cloth 120 is wrapped around the assembly 100, adhering to and covering the extension cable 112 and over-lapping the other end of the cloth 120 to form a tightly sealed enclosure 123 (FIG. 7). It should be noted that due to the flexible nature of the extension cable 112, the profile of the assembly 100 and cloth 120 is much smoother and flatter than the related art design. This is because a certain amount of slack is required in the cloth of the related art design in order to insert and bend the stiff multiple layers of the cloth, which is not required with the flexible extension cable 112.

Figure 8:
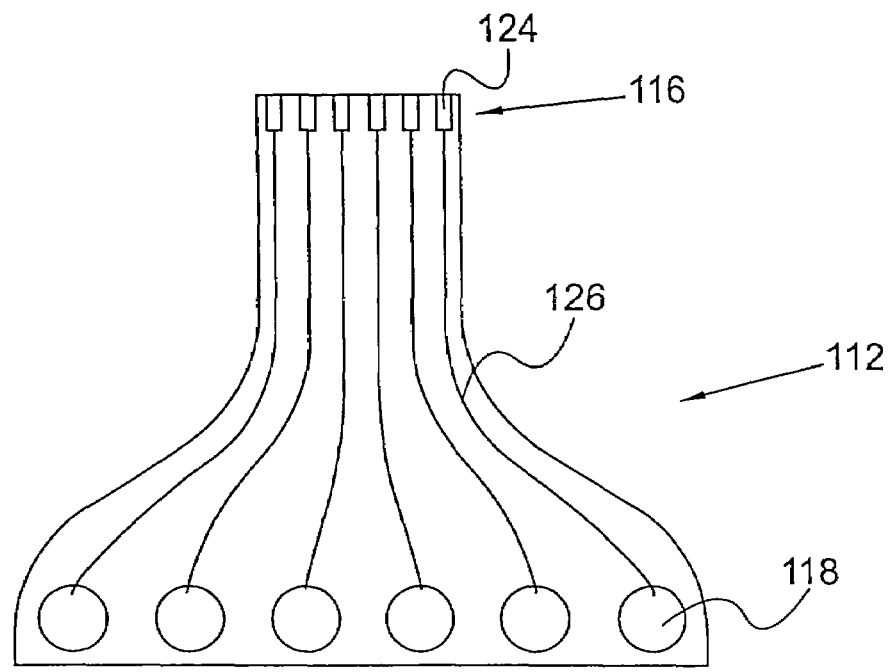
FIG. 8 depicts an enlarged top view of the extension cable in accordance with the present invention.
Figure 9:
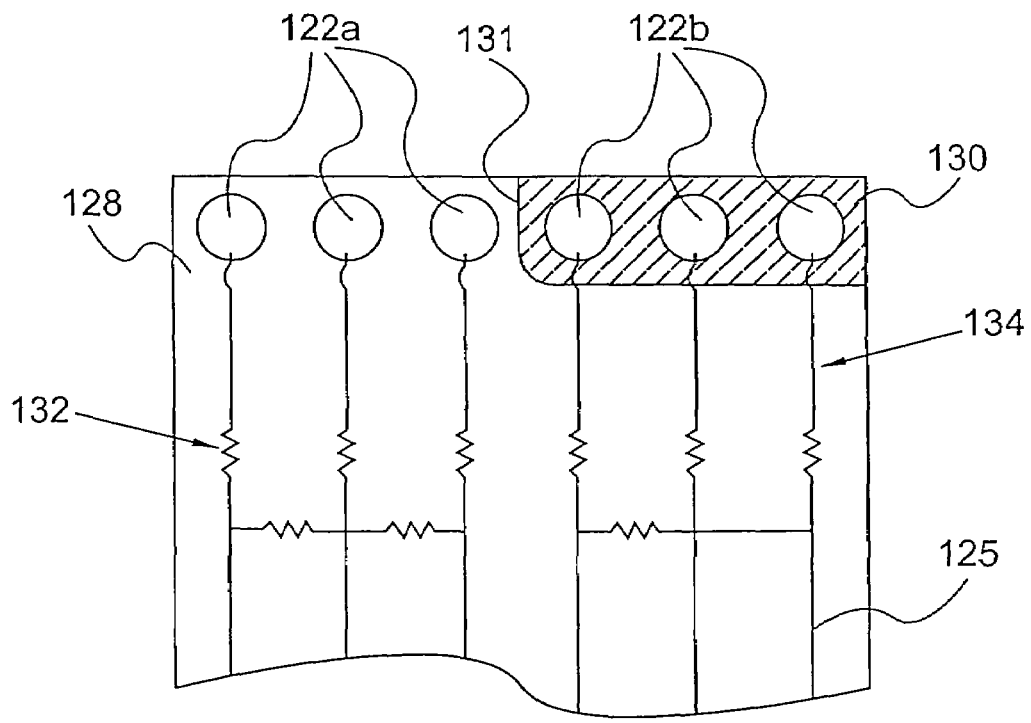
FIG. 9 depicts an enlarged top view of the cloth bonding pads in accordance with the present invention.

FIGS. 8 and 9 show greater detail of the extension cable 112 and bonding pads 122 of the cloth 120, respectively, in a top view. In particular, the cable end 116 at a first end of the extension cable 112 includes a plurality of interconnections 124 that mate with and form an electrical connection with the cryptographic processor card 102 inside the assembly 100. The interconnections 124 are formed of copper with a nickel/gold plating, or other similarly used material. Each bonding pad 118 has a corresponding interconnection 124. Wires 126 connect each bonding pad 118 with an interconnection 124.

Each bonding pad 122 formed on the first end of the cloth 120 corresponds to the location of, and aligns with, each bonding pad 118 of the extension cable 112. In this example, the cloth 120 comprises a first or top layer 128 and a second or bottom layer 130. As illustrated, the top layer 128 is partially cut away to remove section 131, thereby exposing the bottom layer 130 for connection to the extension cable 112.

In this example, the top layer 128 of the cloth 120, for instance, the pierce and laser respondent layer, has three bonding pads 122a associated therewith. A system of connections 132, particularly a plurality of resistors formed in parallel and/or series, run throughout the layer 128, (a schematic representation of which is illustrated in FIG. 9), and connect the traces 125 within the layer 128 to the bonding pads 122a. Similarly, the bottom layer 130, for instance, the delamination respondent layer, has three bonding pads 122b associated therewith. A system of connections 134, particularly a plurality of resistors formed in parallel and/or series, run throughout the layer 130, (a graphic representation of which is illustrated in FIG. 9), and connect the traces 125 within the layer 130 to the bonding pads 122b.

A change in resistance within the system of connections 132, 134 indicates a break or short in the traces 125 within the respective layers 128, 130, e.g., caused by an attempted break-in. This change in resistance is detected as a change in voltage drop across the resistor network, which is then relayed to the corresponding bonding pads 122a, 122b of the cloth 120. The bonding pads 122a, 122b, in turn relay the change in voltage drop to the corresponding bonding pads 118 of the extension cable 112, which then transfers the message through wires 126 and interconnections 124 to the cryptographic processor card 102. Thereafter, the cryptographic processor card 102 may take the appropriate precautions to prevent the information from being divulged, such as erasing the stored key codes for encrypting and decrypting the secured information.

The extension cable 112 provides for easier connection of the cloth 120 to the assembly 100 than with conventional techniques. This is particularly true due to the small size and tight tolerances of the assembly opening 114 and the interconnections 124. The extension cable 112 also provides a surface large enough to facilitate an automated assembly process. Likewise, because the interconnections 124 are formed on the extension cable 112 rather than on the end of the cloth 120, the cable end 116 can be inserted in the opening 114 of the assembly 100 without first adhering the cloth 120 to the assembly 100. This reduces the problems associated with proper placement and alignment of the cloth 120. Also, due to the flexible nature of the extension cable 112, slight misalignment of the cloth 120 can be compensated for when the extension cable 112 is connected to the cloth 120. In fact, misalignment of several millimeters may be tolerable between the bonding pads 118, 122. Furthermore, because the interconnections 124 are formed of copper with a nickel/gold plating, rather than silver ink, the electromigration problems are minimized.

It should be noted that the embodiments disclosed above are not intended to limit the scope of the present invention in any way. For instance, the cloth 120 may be formed of more or less layers than that of the cloth 120 described herein. In which case, a system of connections and corresponding bonding pads would be needed for each layer. Furthermore, the number of bonding pads on each layer, and the corresponding bonding pads on the extension cable, may be varied as needed.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

We claim:

1. A method of forming a security enclosure, comprising: providing an electronic assembly; providing an extension having a first end inserted in the assembly and a second end having at least one bonding pad thereon; and providing a tamper respondent wrap at least partially surrounding the assembly, the wrap having a bonding pad, wherein the bonding pad of the extension is secured to the bonding pad of the wrap, wherein the tamper respondent wrap comprises a plurality of layers, wherein a plurality of electrically conductive lines or a plurality of electrically conductive ink traces exist within each layer of the wrap;

wherein a first layer and a second layer of the plurality of layers each comprise a first conductive ink trace, a second conductive ink trace, and a third conductive ink trace which are oriented parallel to one another and each further comprise a fourth conductive ink trace that is mechanically and electrically connected to both the first conductive ink trace and the third conductive ink trace, and wherein the first conductive ink trace, the second conductive ink trace, and the third conductive ink trace are each in direct mechanical and electrical contact with a respective first bonding pad, second bonding pad, and third bonding pad.

2. The method of claim 1, wherein an entire first surface of the bonding pad of the wrap is in direct mechanical contact with the wrap at a contact surface portion of the wrap.

3. The method of claim 1, wherein an entire first surface of the bonding pad of the extension is in direct mechanical contact with the extension at a contact surface portion of the extension.

4. The method of claim 1, wherein the plurality of layers comprises at least three layers that include the first layer and the second layer.

5. The method of claim 1, wherein the tamper respondent wrap includes an adhesive inner surface that adheres the wrap to the electronic assembly.

6. The method of claim 1, wherein each layer of the wrap comprises the electrically conductive lines, and wherein the electrically conductive lines include an electrically conductive thermoplastic polymer.

7. The method of claim 1, wherein each layer of the wrap comprises the electrically conductive lines, and wherein the electrically conductive lines include an electrically conductive thermoset polymer.

8. The method of claim 1, wherein each layer of the wrap comprises the electrically conductive ink traces, wherein the tamper respondent wrap further includes a system of resistors within each layer of the wrap, and the system of resistors in each layer electrically connects the bonding pads of the each layer to the ink traces of each layer.

9. The method of claim 1, wherein the method comprises applying heat and pressure to the bonding pad of the extension and the bonding pad of the wrap in a thermal compression bonding process until the the bonding pad of the extension and the bonding pad of the wrap begin to melt and bond together, which results in the bonding pad of the extension being secured to the bonding pad of the wrap.

10. The method of claim 1,
wherein the bonding pad of the extension and the bonding pad of the wrap are each formed of a conductive thermo set polymer; and
wherein the method comprises bonding together the bonding pad of the extension and the bonding pad of the wrap with a conductive adhesive disposed between the bonding pad of the extension and the bonding pad of the wrap, which results in the bonding pad of the extension being secured to the bonding pad of the wrap.

11. The method of claim 3, wherein the contact surface portion of the extension is aligned directly above the entire first surface of the bonding pad of the extension and the entire first surface of the bonding pad of the wrap.

12. The method of claim 8, wherein the system of resistors within each layer comprises a plurality of electrically parallel paths such that each parallel path comprises a plurality of resistors.

* * * * *